US012684233B2

(12) United States Patent
Suzuki

(10) Patent No.: US 12,684,233 B2
(45) Date of Patent: Jul. 14, 2026

(54) ACCESSORY APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Kazuto Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 18/800,239

(22) Filed: Aug. 12, 2024

(65) Prior Publication Data

US 2025/0071420 A1    Feb. 27, 2025

(30) Foreign Application Priority Data

Aug. 24, 2023    (JP) ................................. 2023-136175

(51) Int. Cl.
*H04N 23/667* (2023.01)
*H04N 13/239* (2018.01)
*H04N 13/344* (2018.01)

(52) U.S. Cl.
CPC ......... *H04N 23/667* (2023.01); *H04N 13/239* (2018.05); *H04N 13/344* (2018.05)

(58) Field of Classification Search
CPC .. H04N 13/218; H04N 13/239; H04N 13/344; H04N 23/667
See application file for complete search history.

(56) References Cited

U.S. PATENT DOCUMENTS

| 5,907,724 | A | * | 5/1999 | Uno | ........................ | G02B 7/102 |
| | | | | | | 396/82 |
| 2023/0185052 | A1* | | 6/2023 | Lee | ........................ | G02B 7/102 |
| | | | | | | 359/823 |
| 2023/0308627 | A1* | | 9/2023 | Ito | ............................ | G02B 7/06 |

FOREIGN PATENT DOCUMENTS

| EP | | 4145210 | A2 | * | 3/2023 | ......... G02B 27/0172 |
| JP | | 2023037539 | A | | 3/2023 | |

* cited by examiner

*Primary Examiner* — Antoinette T Spinks
(74) *Attorney, Agent, or Firm* — ROSSI, KIMMS & McDOWELL LLP

(57) ABSTRACT

An accessory apparatus attachable to an image pickup apparatus includes a first optical system, a second optical system arranged in parallel with the first optical system; and a processor configured to control the first optical system and the second optical system. The processor has a first mode for simultaneously driving the first optical system and the second optical system, and a second mode for independently driving the first optical system and the second optical system. The processor is configured to vary a timing of changing from the first mode to the second mode according to an imaging state.

14 Claims, 7 Drawing Sheets

ACCESSORY APPARATUS, IMAGE PICKUP APPARATUS, CONTROL METHOD, AND STORAGE MEDIUM

BACKGROUND

Technical Field

One of the aspects of the embodiments relates to an accessory apparatus, an image pickup apparatus, a control method, and a storage medium.

Description of Related Art

An imaging method has conventionally been known as a method for capturing stereoscopic images, which connects a compound-eye lens unit configured to capture a plurality of images from different viewpoints, to a general monocular camera body. Images captured by this method are recorded as a single image in the camera body. The observer can view a stereoscopic image when it is displayed on a device such as a head mount display (HMD) so that the observer's left eye can view only a left-eye image and the observer's right eye can view only a right-eye image.

Japanese Patent Laid-Open No. 2023-37539 discloses a lens apparatus that includes a first focusing unit connected to both a right-eye optical system and a left-eye optical system, and a second focusing unit connected to either the right-eye optical system or the left-eye optical system.

The lens apparatus disclosed in Japanese Patent Laid-Open No. 2023-37539 may cause a focus difference between the right-eye optical system and the left-eye optical system in a case where the second focusing unit operates during imaging, such as during moving image capturing.

SUMMARY

An accessory apparatus according to one aspect of the disclosure attachable to an image pickup apparatus includes a first optical system, a second optical system arranged in parallel with the first optical system; and a processor configured to control the first optical system and the second optical system. The processor has a first mode for simultaneously driving the first optical system and the second optical system, and a second mode for independently driving the first optical system and the second optical system. The processor is configured to vary a timing of changing from the first mode to the second mode according to an imaging state.

An image pickup apparatus according to another aspect of the disclosure attachable to and detachable from an accessory apparatus that includes a first optical system, and a second optical system arranged in parallel with the first optical system includes a processor configured to control the first optical system and the second optical system by communicating with the accessory apparatus. The processor has a first mode for simultaneously driving the first optical system and the second optical system, and a second mode for independently driving the first optical system and the second optical system. The processor is configured to vary a timing of changing from the first mode to the second mode according to an imaging state.

A control method of an optical system corresponding to the above accessory and the image pickup apparatus also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
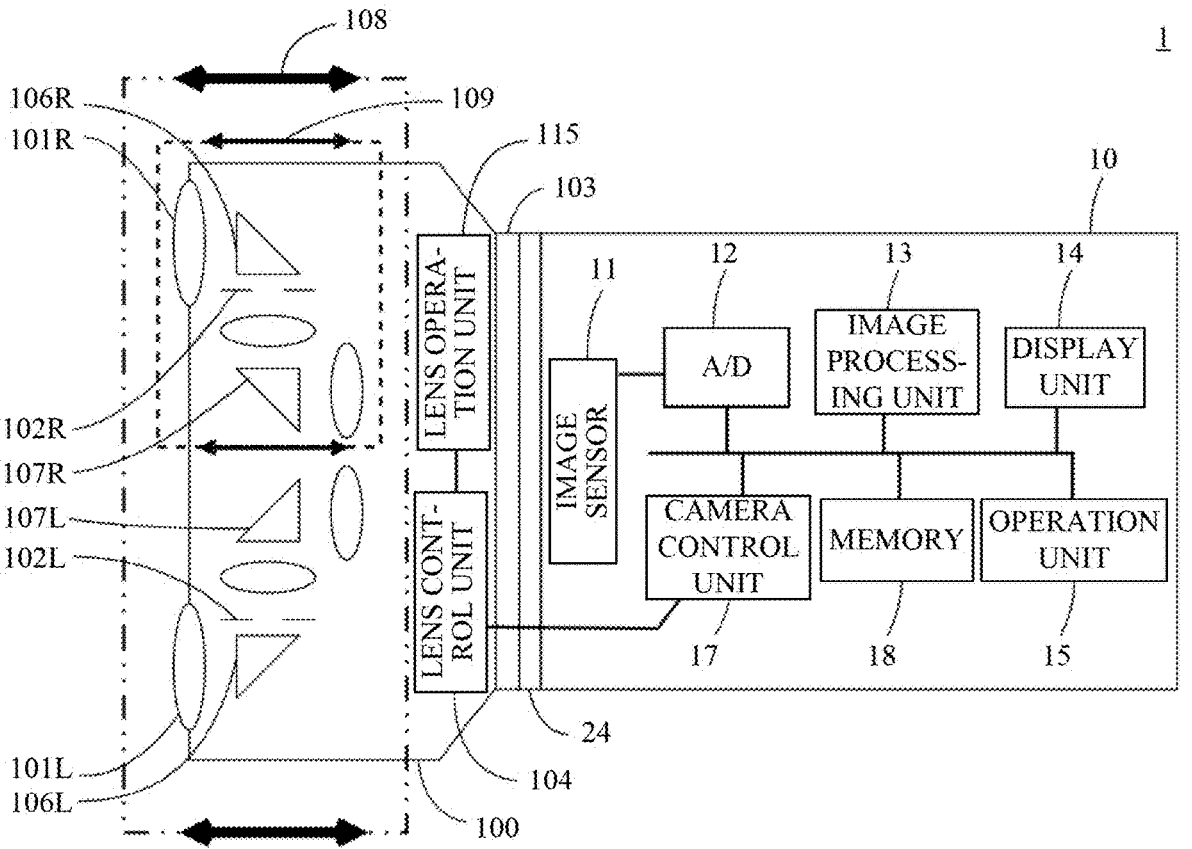
FIG. 1 is a configuration diagram of a camera system according to each example.

Referring now to FIG. 1, a description will now be given of a camera system (imaging system) 1 according to each example. FIG. 1 is a configuration diagram and a top view of the camera system (imaging system) 1. The camera system 1 includes a camera (image pickup apparatus or optical apparatus) 10 and an interchangeable lens (lens apparatus, accessory apparatus, or optical apparatus) 100 that can be attached to the camera 10. Each example is similarly applicable to an imaging system in which the image pickup apparatus and the lens apparatus are integrated. In each example, the interchangeable lens (simply referred to as "lens" in the drawings) 100 serves as the accessory apparatus, but the present disclosure is not limited to this example. Each example is also applicable to an accessory apparatus (adapter (optical apparatus) such as an extender) other than the interchangeable lens 100. The adapter is attachable to and detachable from the camera 10 directly or via the interchangeable lens 100 (can be attached between the camera 10 and the interchangeable lens 100). The camera 10 includes a camera mount 24 and the interchangeable lens 100 includes a lens mount 103, and each mount has electrical contacts that are used for power supply from the camera 10 to the interchangeable lens 100 and for communications between them. The interchangeable lens 100 includes a right-eye lens unit (right-eye optical system, first optical system) 101R and a left-eye lens unit (left-eye optical system, second optical system) 101L arranged in parallel with the right-eye lens unit 101R.

The camera 10 includes an image sensor 11, an A/D converter 12, an image processing unit 13, a display unit 14, an operation unit 15, a camera control unit 17, and a memory 18. The image sensor 11 is a photoelectric conversion element such as a CMOS (Complementary Metal-Oxide-Semiconductor) sensor or a CCD (Charge Coupled Device) sensor. The image sensor 11 photoelectrically converts object images formed by the right-eye lens unit 101R and the left-eye lens unit 101L and outputs electrical signals (analog electrical signals).

The A/D converter 12 converts the analog electrical signals output from the image sensor 11 into digital signals. The image processing unit generates an image (image data) by performing various image processing for the digital signal. The image generated by the image processing unit is displayed on the display unit 14 or stored in the memory 18 such as a storage medium. The operation unit 15 includes a power switch for powering on and off the camera 10, an imaging switch for starting recording of a still or moving image, and a selection/setting switch for setting the camera 10 and the interchangeable lens 100. The camera control unit 17 includes a microcomputer such as a CPU, and controls the image processing unit and communications with the interchangeable lens 100 according to a signal from the operation unit 15 based on the user's operation. The interchangeable lens 100 includes prisms 106R, 107R, 106L, and 107L that change a direction of the optical axis by 90 degrees by reflection. The interchangeable lens 100 includes a lens control unit 104. The lens control unit 104 includes a microcomputer that controls an aperture stop and focus of each optical system according to a control signal received from the camera control unit 17 through communications with the camera control unit 17 or a user operation to the lens operation unit 115. The lens operation unit 115 includes a setting switch for changing the operation of each optical system, and a ring operation unit for operating an optical member such as the focus and aperture stop. The lens control unit 104 controls each unit according to a user operation of the lens operation unit 115.

Figure 2:
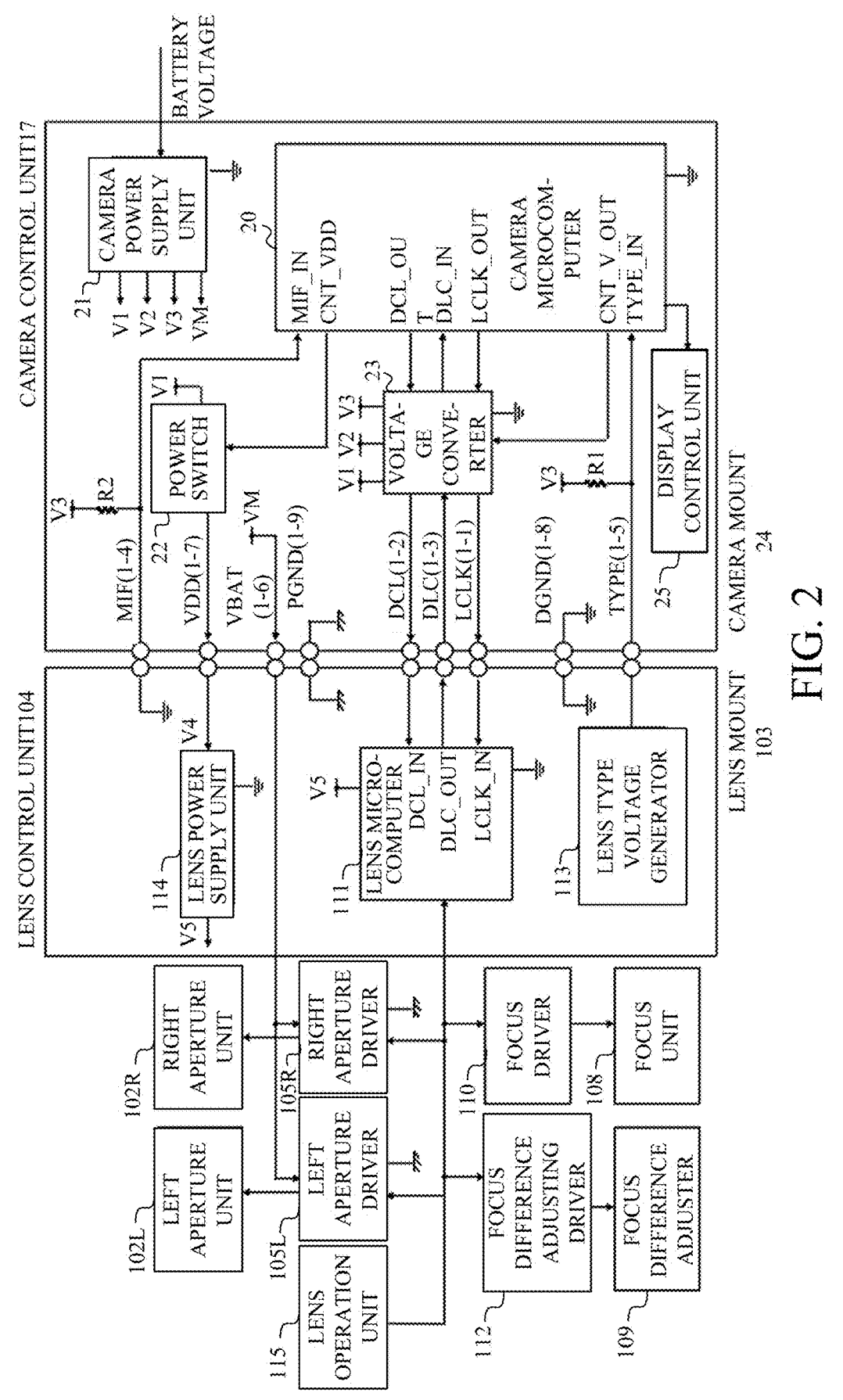
FIG. 2 is a configuration diagram of a camera control unit and a lens control unit according to each example.

Referring now to FIG. 2, a description will be given of the camera control unit 17 and the lens control unit 104. FIG. 2 is a configuration diagram of the camera control unit 17 and the lens control unit 104, and illustrates the configurations of the camera control unit 17 and the lens control unit 104, and terminals for electrical connections via the camera mount 24 and the lens mount 103.

An LCLK terminal (1-1) is a terminal for communication control signals output from the camera 10 to the interchangeable lens 100. A DCL terminal (1-2) is a terminal for communication data output from the camera 10 to the interchangeable lens 100. A DLC terminal (1-3) is a terminal for communication data output from the interchangeable lens 100 to the camera 10.

A MIF terminal (1-4) is a terminal that is used to detect that the interchangeable lens 100 has been attached to the camera 10. A microcomputer (camera microcomputer) 20 in the camera control unit 17 detects that the interchangeable lens 100 has been attached to the camera 10 based on the voltage of the MIF terminal.

A TYPE terminal (1-5) is a terminal that is used to detect the type of interchangeable lens 100 attached to the camera 10. The camera microcomputer 20 detects the type of interchangeable lens 100 attached to the camera 10 based on the voltage of the TYPE terminal. The voltage of the TYPE terminal is generated by a lens type voltage generator 113 in the lens control unit 104.

A VBAT terminal (1-6) is used to supply a drive power source (VM) from the camera 10 to the interchangeable lens 100, which is used for various operations except for the communication control. A VDD terminal (1-7) is a terminal that is used to supply a communication control power supply (VDD) for the communication control from the camera 10 to the interchangeable lens 100. A DGND terminal (1-8) is a terminal that grounds the communication control systems of the camera 10 and the interchangeable lens 100. A PGND terminal (1-9) is a terminal that is used to ground mechanical drive systems including motors provided in the camera 10 and the interchangeable lens 100.

The camera 10 according to this example is selectively mounted with a plurality of types of interchangeable lenses 100 that have different communication voltages with the camera 10. In the following description, the type of interchangeable lens 100 that the camera 10 identifies based on the voltage of the TYPE terminal includes a first interchangeable lens and a second interchangeable lens that has a different communication voltage from that of the first interchangeable lens.

A camera power supply unit 21 provided in the camera control unit 17 converts the battery voltage supplied from an unillustrated battery mounted in the camera 10 into the voltage for the operation of each circuit. At this time, the camera power supply unit 21 generates voltages V1, V2, V3, and VM.

The voltage (first voltage) V1 is a power supply voltage serving as a communication control power supply (VDD) for the first and second interchangeable lenses, and is also a communication voltage for the first interchangeable lens. The voltage (second voltage) V2 is a communication voltage for the second interchangeable lens. The voltage (third voltage) V3 is a power supply voltage serving as an operating power supply for the camera microcomputer 20. The voltage VM is a power supply voltage serving as a drive power supply for the first and second interchangeable lenses.

In a case where a power switch 22 is turned on, the camera microcomputer 20 starts supplying VDD and VM from the camera 10 to the interchangeable lens 100. In a case where the power switch 22 is turned off, the camera microcomputer 20 stops supplying VDD and VM from the camera 10 to the interchangeable lens 100.

The camera microcomputer 20 communicates with the interchangeable lens 100 via a voltage converter 23. The camera microcomputer 20 includes an LCLK OUT terminal that outputs a communication control signal, a DCL_OUT terminal that outputs communication data to the interchangeable lens 100, and a DLC IN terminal that accepts an input of communication data from the interchangeable lens 100. The communication control signal and communication data correspond to communication signals. The camera microcomputer 20 functions as a camera communication unit.

The camera microcomputer 20 further includes a MIF_IN terminal for detecting the attachment of the interchangeable lens 100, a TYPE_IN terminal for identifying the type of the interchangeable lens 100, and a CNT_V_OUT terminal for outputting a communication voltage switching signal to the voltage converter 23. The camera microcomputer 20 functions as an accessory determining unit. The camera microcomputer 20 further includes a CNT_VDD_OUT terminal that outputs a power supply signal for the power switch 22, a connection terminal to the image processing unit 13, and a connection terminal to the operation unit 15. The camera microcomputer 20 further controls the operation of the display unit 14 via a display control unit 25.

The microcomputer (lens microcomputer) 111 in the lens control unit 104 communicates with the camera microcomputer 20 via the voltage converter 23. The lens microcomputer 111 includes an LCLK_IN terminal that receives an input of a communication control signal, a DLC_OUT terminal that outputs communication data to the camera 10, and a DCL_IN terminal that receives an input of communication data from the camera 10. The lens microcomputer 111 further includes connection terminals with right and left aperture drivers 105R and 105L, a focus driver 110, and a focus difference adjusting driver 112. The lens control unit 104 further includes a lens power supply unit (voltage generator) 114.

A description will now be given of attachment detection of the interchangeable lens 100 to the camera 10. The MIF_IN terminal of the camera microcomputer 20 is pulled up to a power supply by resistor R2 (100 KΩ). Therefore, in a case where the interchangeable lens 100 is not attached, the voltage value becomes H (High). However, in a case where the interchangeable lens (first or second interchangeable lens) 100 is attached, the MIF_IN terminal is connected to ground (GND) in the interchangeable lens 100. Thus, regardless of the type of interchangeable lens 100, the voltage value becomes low (L) in a case where the interchangeable lens 100 is attached.

The interchangeable lens 100 has right and left aperture drivers 105R and 105L that drive actuators that operate right and left aperture units 102R and 102L. The interchangeable lens 100 further includes the focus driver 110 that operates a focus unit 108. The interchangeable lens 100 further includes a focus difference adjusting driver 112 that operates a focus difference adjuster 109.

In FIG. 1, the focus difference adjuster 109 is located on the right eye side, but this is not limited to this implementation and the focus difference adjuster 109 may be located on the left eye side. Although the two aperture drivers 105R and 105L are provided, the present disclosure is not limited to this implementation, and the right and left aperture units 102R and 102L may be simultaneously driven using a single aperture driver. The focus driver 110 may be an integrated left and right drive mechanism, or separate left and right drive mechanisms may be simultaneously operated by separate motors.

Figures 3A, 3B:
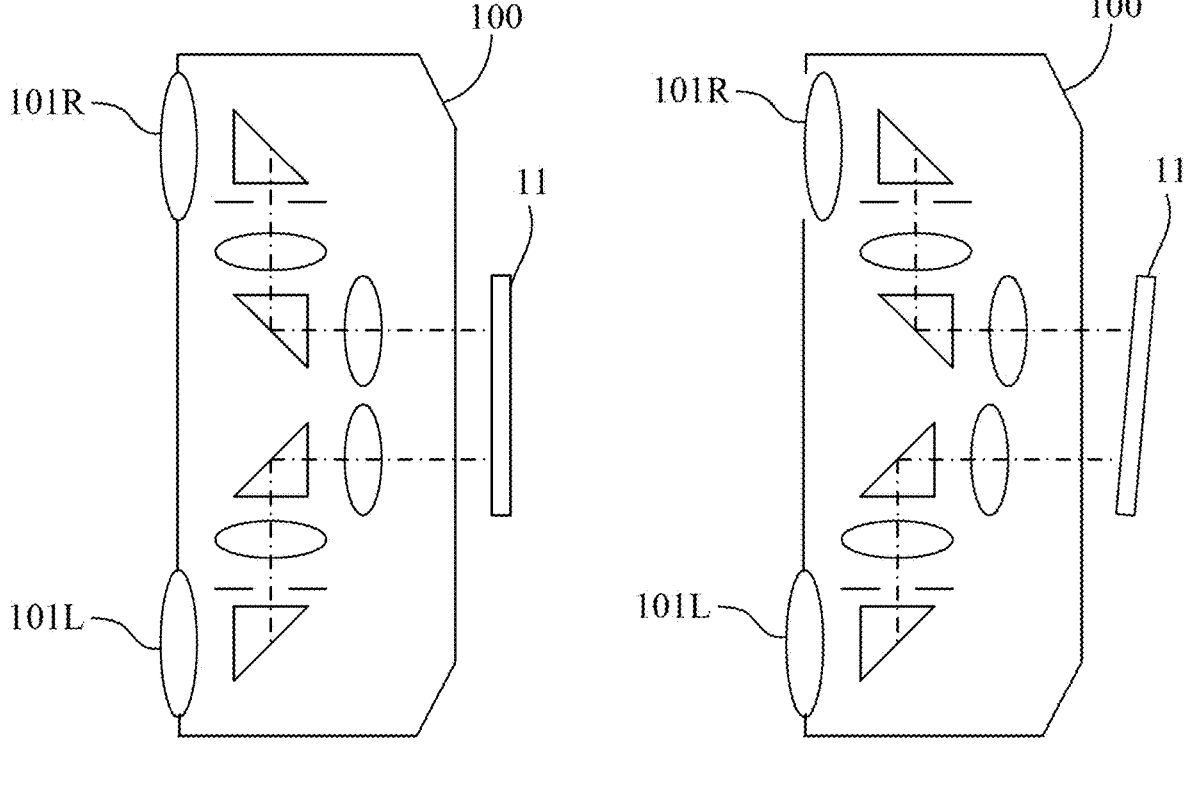
FIGS. 3A and 3B explain focus difference adjustment between a right-eye lens unit and a left-eye lens unit according to each example.

Referring now to FIGS. 3A and 3B, a description will be given of the adjustment of a focus difference between the right-eye lens unit 101R and the left-eye lens unit 101L. FIGS. 3A and 3B explain the adjustment of the focus difference between the right-eye lens unit 101R and the left-eye lens unit 101L. In the interchangeable lens 100, a relative focus difference between the right-eye lens unit 101R and left-eye lens unit 101L may occur due to variations in the tilt direction and tilt amount of the image sensor 11 caused by individual differences in the camera 10, or due to a decrease in reliability caused by temperature, humidity, impact, etc. FIG. 3A illustrates an ideal case where the image sensor 11 is not tilted. FIG. 3B illustrates a case where the image sensor 11 is tilted. In the case of FIG. 3B, even if the right-eye lens unit 101R and the left-eye lens unit 101L are moved together, their in-focus states cannot be obtained simultaneously. In other words, a left-right relative focus difference occurs as a shift in the focus state between the right-eye lens unit 101R and the left-eye lens unit 101L.

Accordingly, each example can change a focus position of each of the right-eye lens unit 101R and the left-eye lens unit 101L using the focus difference adjuster 109 (second drive mode). After the focus position is adjusted as illustrated in FIG. 3B, the right-eye lens unit 101R and the left-eye lens unit 101L are synchronously moved using the focus unit 108 (second drive mode). Thereby, imaging corresponding to the tilt of the imaging surface can be performed.

In each example, the lens control unit 104 controls the right-eye lens unit 101R and the left-eye lens unit 101L. The lens control unit 104 has a first drive mode (first mode) and a second drive mode (second mode) as drive modes for the right-eye lens unit 101R and the left-eye lens unit 101L. The first drive mode is a mode in which the right-eye lens unit 101R and the left-eye lens unit 101L are simultaneously driven using the focus driver 110. The second drive mode is a mode in which the right-eye lens unit 101R and the left-eye lens unit 101L are independently driven using the focus difference adjusting driver 112. The lens control unit 104 varies the timing of changing from the first drive mode to the second drive mode according to the imaging state.

A description will now be given of each example of the present disclosure.

Example 1

Figure 4:
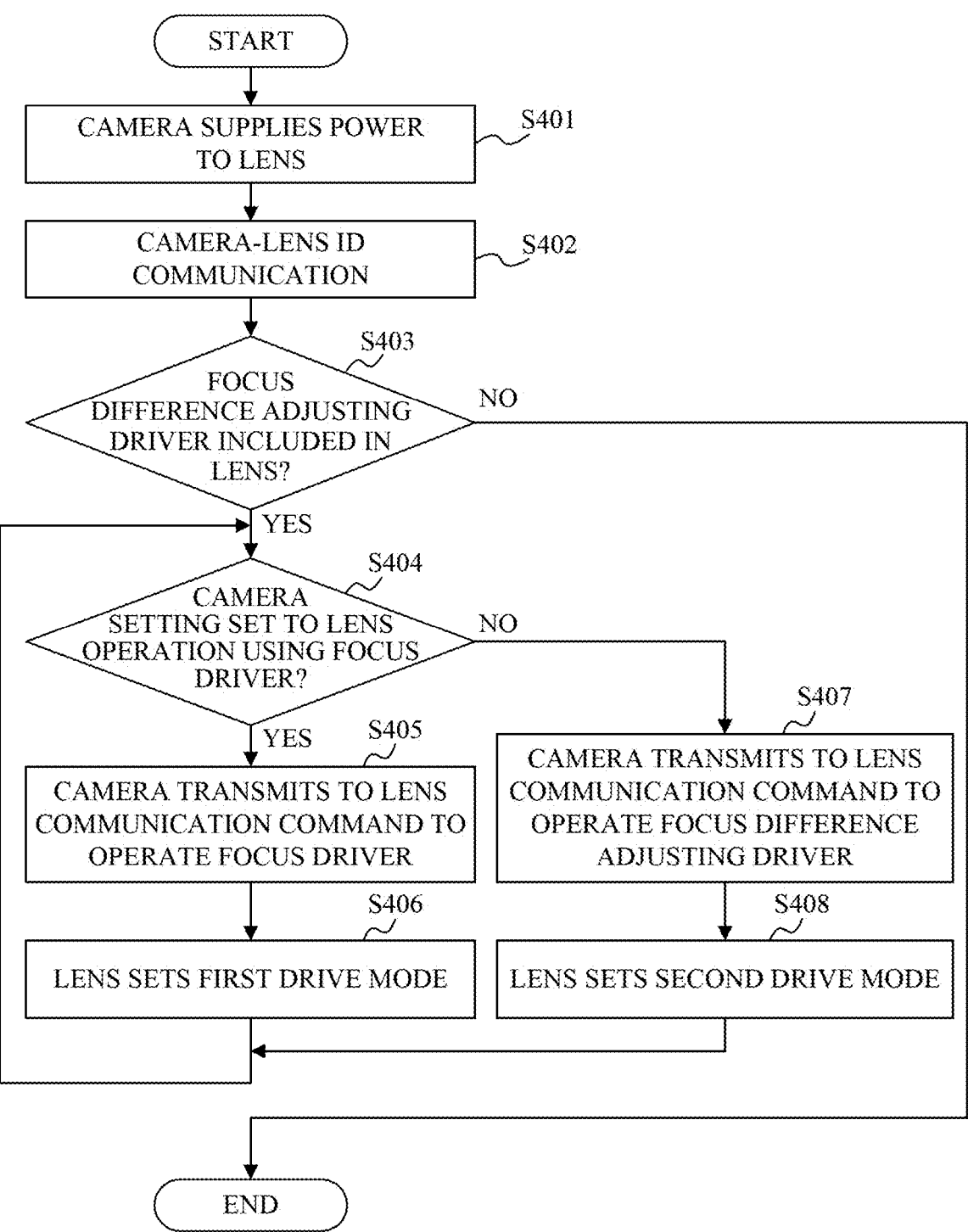
FIG. 4 is a flowchart illustrating a control method in which an interchangeable lens according to Example 1 sets a drive mode in accordance with a communication command from the camera.
Figure 5:
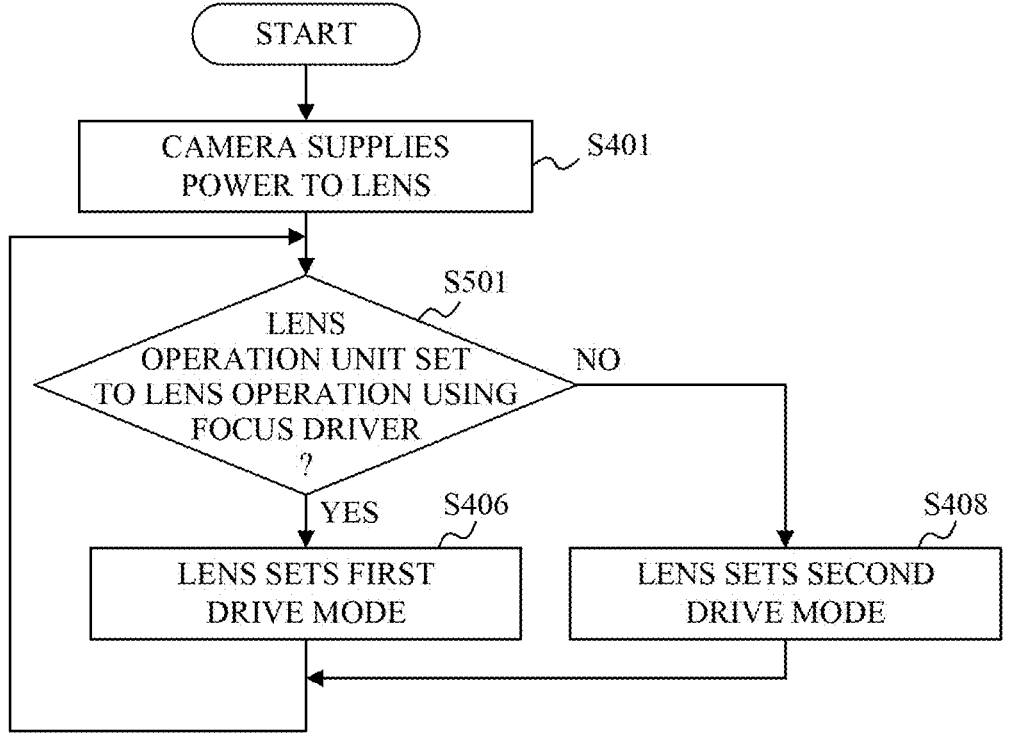
FIG. 5 is a flowchart illustrating a control method in a case where an interchangeable lens according to Example 1 sets a drive mode using an operation unit.
Figure 6:
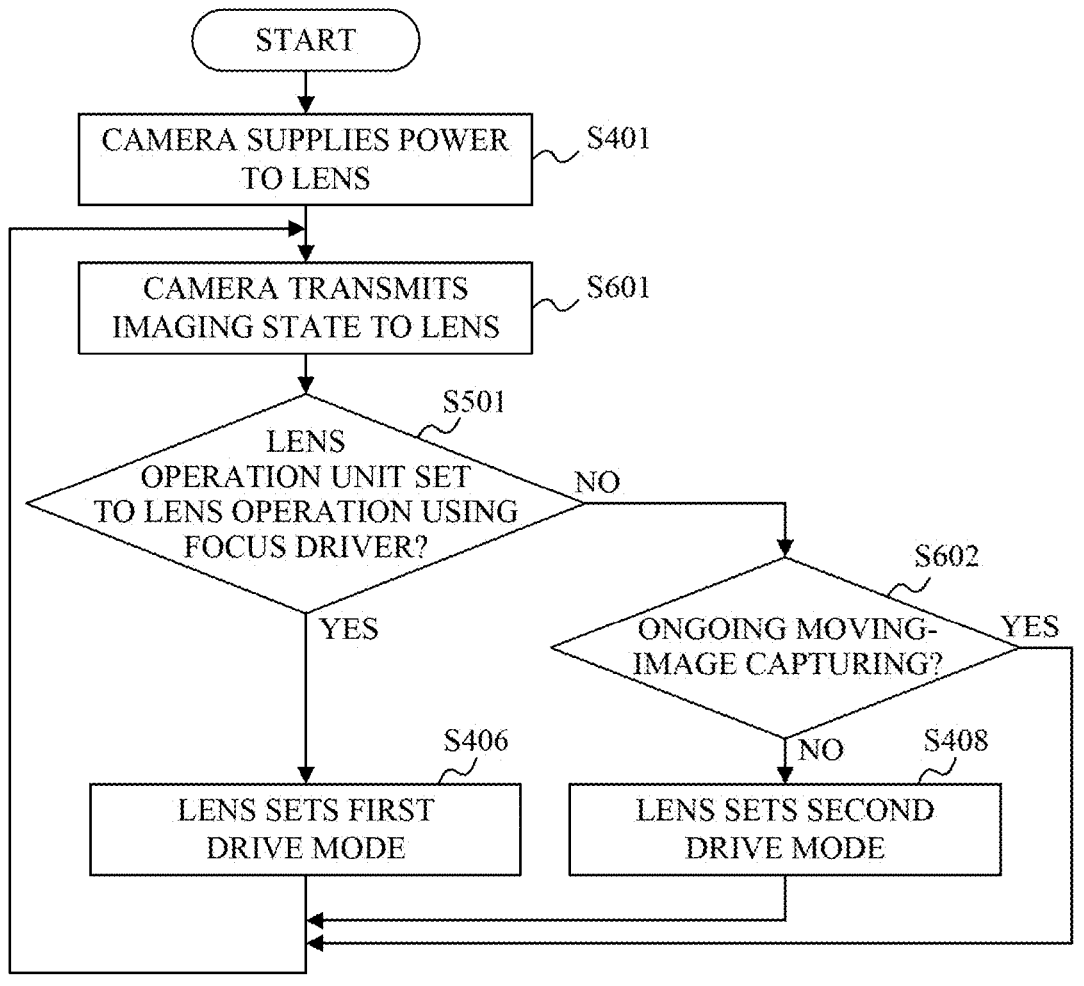
FIG. 6 is a flowchart illustrating a control method in a case where the interchangeable lens according to Example 1 sets a drive mode in accordance with a state of the camera.

Referring now to FIGS. 4 to 6, a description will be given of Example 1 according to the present disclosure. This example will describe a method of setting one of the first drive mode (first mode) or the second drive mode (second mode) in which the interchangeable lens 100 is to operate.

FIG. 4 is a flowchart illustrating a control method in which the interchangeable lens 100 (lens control unit 104) receives a communication command relating to the drive mode from the camera 10 (camera control unit 17) and sets a drive mode based on the communication command.

First, in step S401, the camera 10 supplies power to the interchangeable lens 100. Next, in step S402, the camera 10 and the interchangeable lens 100 perform ID communication (camera-lens ID communication) with each other. Next, in step S403, the camera 10 determines whether or not the interchangeable lens 100 has the focus difference adjusting driver 112. Here, whether or not the interchangeable lens 100 has the focus difference adjusting driver 112 may be determined based on the result of the ID communication performed in step S402. In a case where it is determined that the interchangeable lens 100 has the focus difference adjusting driver 112, the flow proceeds to step S404. On the other hand, in a case where it is determined that the interchangeable lens 100 has no focus difference adjusting driver 112, the process ends.

In step S404, the camera 10 (camera microcomputer 20) determines whether or not the drive mode (lens operation) of the interchangeable lens 100 is set to drive using the focus driver 110 according to the setting of the camera 10. Here, the drive mode may be set by a user interface using the display unit 14. The drive mode may also be determined from the state of the operation unit 15. In a case where the lens operation is set to drive using the focus driver 110 according to the setting of the camera 10, the flow proceeds to step S405. On the other hand, in a case where the lens operation is not set to drive using the focus driver 110, the flow proceeds to step S407.

In step S405, the camera 10 sends a communication command to the interchangeable lens 100 to operate the focus driver 110. Then, in step S406, the interchangeable lens 100 sets the first drive mode to operate the focus driver 110, and the flow proceeds to step S404.

In step S407, the camera 10 sends a communication command to the interchangeable lens 100 to operate the focus difference adjusting driver 112. Then, in step S408, the interchangeable lens 100 sets the second drive mode to operate the focus difference adjusting driver 112, and the flow proceeds to step S404.

The control method of FIG. 4 can change the drive mode of the interchangeable lens 100 whenever the setting of the camera 10 (the state of the mode setting unit that constitutes part of the operation unit 15) is changed. The drive mode of the interchangeable lens 100 can be changed by the setting of the camera 10, but is not limited to this implementation. For example, the drive mode may be set or changed according to the state of the lens operation unit 115.

FIG. 5 is a flowchart illustrating a control method for setting the drive mode according to the state of the lens operation unit 115 (mode setting unit constituting a part of the lens operation unit 115).

First, in step S401, the camera 10 supplies power to the interchangeable lens 100, similarly to FIG. 4. Next, in step S501, the interchangeable lens 100 determines whether or not the lens operation unit 115 is set to a lens operation using the focus driver 110. In a case where the lens operation unit 115 is set to the lens operation using the focus driver 110, the flow proceeds to step S406. On the other hand, in a case where the lens operation unit 115 is not set to the lens operation using the focus driver 110, the flow proceeds to step S408. In step S406, the interchangeable lens 100 sets the first drive mode to operate the focus driver 110, and the flow proceeds to step S501. In step S408, the interchangeable lens 100 sets the second drive mode so as to operate the focus difference adjusting driver 112, and the flow proceeds to step S501.

According to the control method of FIG. 5, the interchangeable lens 100 sets or changes the drive mode of the interchangeable lens 100 in accordance with the state of the lens operation unit 115. In this case, the camera 10 and the interchangeable lens 100 do not need to perform the communication described in step S402 of FIG. 4.

FIG. 6 is a flowchart illustrating a control method in which the interchangeable lens 100 receives the state of the camera 10 and sets the drive mode.

First, in step S401, the camera 10 supplies power to the interchangeable lens 100. Next, in step S601, the camera 10 transmits the imaging state to the interchangeable lens 100. The imaging state here refers to information, for example, on whether still images are being captured (still images are continuously captured) or a moving image is being captured. However, the imaging state is not limited, and may be, for example, information, for example, on a state of the imaging operation unit (release button) constituting the operation unit 15 of the camera 10 (whether or not the imaging operation unit is being pressed by the user). In this case, the camera 10 can transmit the state of the imaging operation unit to the interchangeable lens 100.

Next, in step S501, the interchangeable lens 100 determines whether the lens operation unit 115 is set to the lens operation using the focus driver 110. In a case where the lens operation unit 115 is set to the lens operation using the focus driver 110, the flow proceeds to step S406. On the other hand, in a case where the lens operation unit 115 is not set to the lens operation using the focus driver 110, the flow proceeds to step S602. In step S406, the interchangeable lens 100 sets the first drive mode so as to operate the focus driver 110, and the flow proceeds to step S601.

In step S602, the interchangeable lens 100 determines whether or not the imaging state received from the camera 10 in step S601 is ongoing moving-image capturing. In a case where the imaging state is ongoing moving-image capturing, the flow proceeds to step S601. On the other hand, in a case where the imaging state is not ongoing moving-image capturing, the flow proceeds to step S408. In step S408, the interchangeable lens 100 sets the second drive mode so as to operate the focus difference adjusting driver 112, and the flow proceeds to step S601.

This example can change the drive mode of the interchangeable lens 100 at a proper timing based on the imaging state of the camera 10. In FIG. 6, it is determined in step S602 whether or not the imaging state of the camera 10 is ongoing moving-image capturing, but this example is not limited to this implementation. Instead of determining whether or not the imaging state is ongoing moving-image capturing, for example, it may be determined whether the imaging state is ongoing still-image capturing (ongoing continuous still-image capturing). Alternatively, in step S602, it may be determined whether the imaging operation unit (release button) constituting the operation unit 15 is being pressed by the user.

In FIG. 6, the state of the lens operation unit 115 is determined in step S501, but this example is not limited to this implementation. The state of the lens operation unit 115 may be determined after the determination in step S602. This allows the interchangeable lens 100 to change the drive mode only if the imaging state of the camera 10 is not ongoing moving-image capturing, etc.

As described above, the lens control unit 104 varies the timing of changing from the first drive mode to the second drive mode according to the imaging state. In a case where the lens control unit 104 acquires an instruction to change from the first drive mode to the second drive mode while the first drive mode is set and the imaging state is a predetermined state, the lens control unit 104 may maintain a setting of the first drive mode in the predetermined state. The lens control unit 104 may change a setting of the first drive mode to a setting of the second drive mode after the predetermined state ends. Here, the predetermined state includes ongoing moving-image capturing, ongoing continuous still-image capturing, a state in which the imaging operation unit is being pressed, and the like.

Example 2

Figure 7:
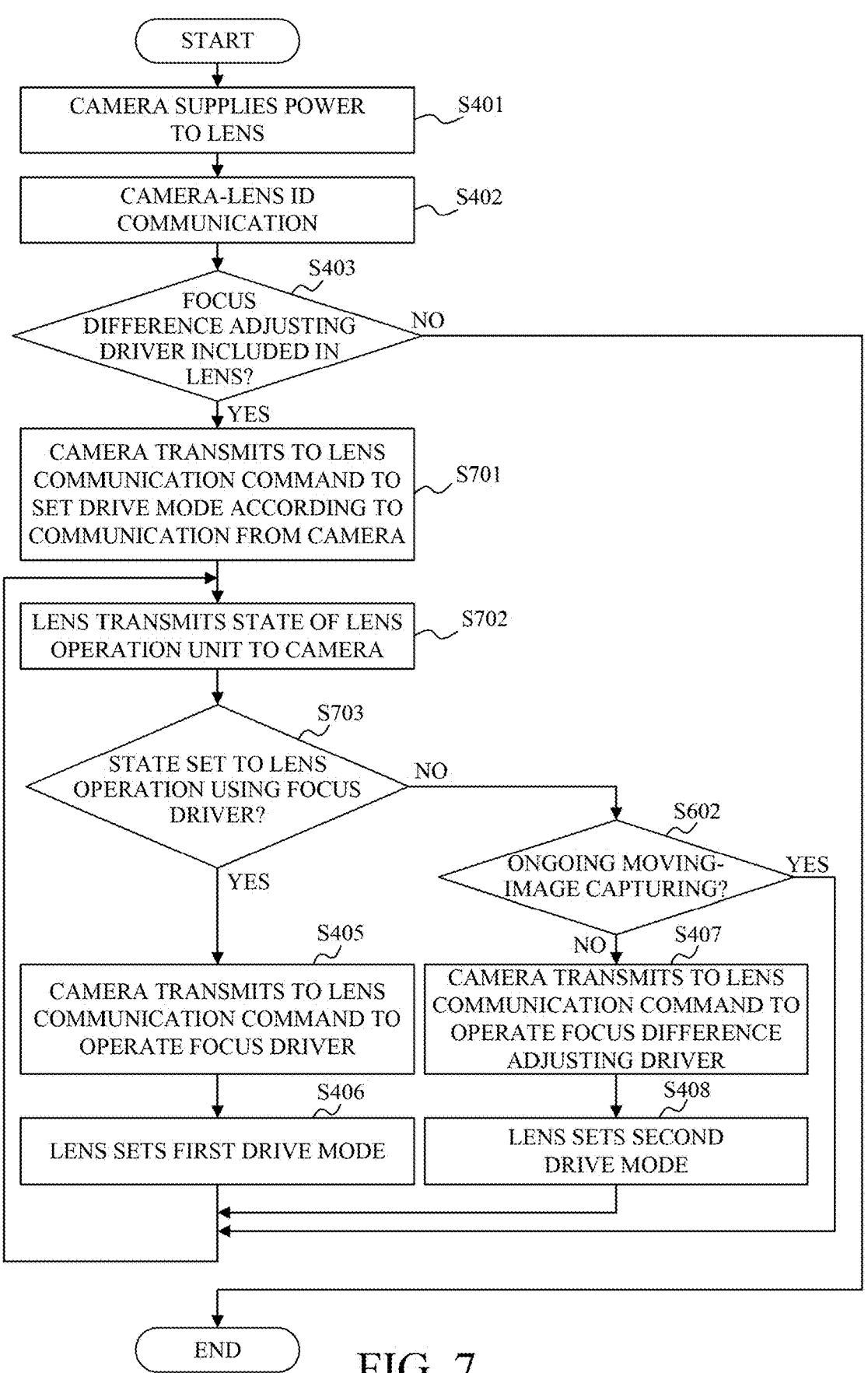
FIG. 7 is a flowchart illustrating a control method in a case where a camera according to Example 2 sends a command to an interchangeable lens to set a drive mode in accordance with the state of the camera.

Referring now to FIG. 7, a description will be given of Example 2 according to the present disclosure. In this example, the camera 10 instructs the interchangeable lens 100 to set the first drive mode (first mode) and the second drive mode (second mode) through communication from the camera 10, and the interchangeable lens 100 sets the drive mode.

FIG. 7 is a flowchart illustrating a control method in which the camera 10 transmits a command to set the drive mode to the interchangeable lens 100 according to the state of the camera 10.

First, in step S401, the camera 10 supplies power to the interchangeable lens 100. Next, in step S402, the camera 10 and the interchangeable lens 100 perform ID communication (camera-lens ID communication) with each other. Next, in step S403, the camera 10 determines whether the interchangeable lens 100 has a focus difference adjusting driver 112. Whether the interchangeable lens 100 has a focus difference adjusting driver 112 may be determined based on the result of the ID communication performed in step S402. In a case where it is determined that the interchangeable lens 100 has the focus difference adjusting driver 112, the flow proceeds to step S404. On the other hand, in a case where it is determined that the interchangeable lens 100 has no focus difference adjusting driver 112, the flow ends.

Next, in step S701, the camera 10 transmits to the interchangeable lens 100 a communication command (second communication command) that instructs the interchangeable lens 100 to set the drive mode according to a communication from the camera 10 (to perform a change instruction based on the first communication command). For example, after receiving the communication command in step S701, the interchangeable lens 100 does not change the drive mode unless it receives a communication (first communication command) for setting the drive mode from the camera 10, even if it acquires an instruction to change the drive mode from the lens operation unit 115.

Next, in step S702, the interchangeable lens 100 transmits the state of the lens operation unit 115 to the camera 10. The state of the lens operation unit 115 may be a state indicating whether a setting of the drive mode by the lens operation unit 115 is the first drive mode or the second drive mode.

Next, in step S703, the camera 10 determines whether the state of the lens operation unit 115 received from the interchangeable lens 100 is set to a lens operation using the focus driver 110. In a case where the state of the lens operation unit 115 is set to the lens operation using the focus driver 110, the flow proceeds to step S405. On the other hand, in a case where the state of the lens operation unit 115 is not set to the lens operation using the focus driver 110, the flow proceeds to step S602. The subsequent steps S405 to S408 are the same as those in FIG. 4, and step S602 is the same as that in FIG. 6, so a description thereof will be omitted.

Thereby, in Example 1, the interchangeable lens 100 changes the drive mode based on the imaging state of the camera 10, but in this example, the camera 10 instructs the interchangeable lens 100 to change the drive mode, and can select a proper drive mode among a plurality of conditions.

In FIG. 7, the drive mode transmitted by the camera 10 is set according to the state of the lens operation unit 115 received by the camera 10 in step S702, but this example is not limited to this implementation. For example, as in step S404 in FIG. 4, information on the drive mode set by the operation unit 15 of the camera 10 may be transmitted to the interchangeable lens 100. The drive mode may be transmitted based on the setting of an accessory apparatus (adapter such as an extender) other than the interchangeable lens 100 connected to the camera 10. There is no limitation on which drive mode the camera 10 transmits from among a plurality of drive mode settings.

This example determines the state of the lens operation unit 115 received in step S703 in FIG. 7, but the state of the lens operation unit 115 received after step S602 may be determined. Thereby, the interchangeable lens 100 can change the drive mode according to the imaging state of the camera 10, etc.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

For example, in a case where the camera control unit 17 receive a predetermined imaging instruction (such as moving-image capturing and continuous still-image capturing) while the camera control unit 17 (or the lens control unit 104) is in the second mode, the camera control unit 17 may be configured to change the second mode to the first drive mode (first mode) and then to permit that imaging.

Each example can provide an accessory apparatus, an image pickup apparatus, a control method, and a storage medium, each of which can adjust a focus difference between the right-eye optical system and the left-eye optical system at a proper timing according to the state of the image pickup apparatus.

This application claims priority to Japanese Patent Application No. 2023-136175, which was filed on Aug. 24, 2023, and which is hereby incorporated by reference herein in its entirety.

What is claimed is:

1. An accessory apparatus attachable to an image pickup apparatus, the accessory apparatus comprising:

a first optical system;

a second optical system arranged in parallel with the first optical system; and a processor configured to control the first optical system and the second optical system, wherein the processor has a first mode for simultaneously driving the first optical system and the second optical system, and a second mode for independently driving the first optical system and the second optical system, wherein the processor is configured to vary a timing of changing from the first mode to the second mode according to an imaging state, and wherein in a case where the processor receives a change instruction from the first mode to the second mode while the first mode is set, and the imaging state is a predetermined state, the processor is configured to maintain a setting of the first mode while the imaging state is the predetermined state.

2. The accessory apparatus according to claim 1, wherein the processor is configured to change a setting of the first mode to a setting of the second mode after the predetermined state of the imaging state ends.

3. The accessory apparatus according to claim 1, wherein the processor is configured to acquire information on the imaging state from the image pickup apparatus, and wherein the predetermined state is at least one of ongoing moving-image capturing and an ongoing continuous still-image capturing.

4. The accessory apparatus according to claim 1, wherein the processor is configured to acquire information on the imaging state from the image pickup apparatus based on a state of an imaging operation unit operable by a user of the image pickup apparatus, and wherein the predetermined state is a state in which the imaging operation unit is being pressed.

5. The accessory apparatus according to claim 1, wherein the processor is configured to acquire the change instruction based on a first communication command received from the image pickup apparatus.

6. The accessory apparatus according to claim 1, wherein the processor is configured to acquire the change instruction based on a state of a mode setting unit operable by a user.

7. The accessory apparatus according to claim 6, wherein in a case where the processor receives from the image pickup apparatus a second communication command instructing to perform the change instruction based on a first communication command, the processor is configured not to change from the first mode to the second mode regardless of the change instruction based on a state of a mode setting unit operable by the user of the image pickup apparatus.

8. The accessory apparatus according to claim 1, wherein the accessory apparatus is a lens apparatus.

9. The accessory apparatus according to claim 1, wherein the accessory apparatus is an adapter attachable to the image pickup apparatus directly or via a lens apparatus.

10. An image pickup apparatus attachable to and detachable from an accessory apparatus that includes a first optical system, and a second optical system arranged in parallel with the first optical system, the image pickup apparatus comprising:

a processor configured to control the first optical system and the second optical system by communicating with the accessory apparatus, wherein the processor has a first mode for simultaneously driving the first optical system and the second optical system, and a second mode for independently driving the first optical system and the second optical system, wherein the processor is configured to vary a timing of changing from the first mode to the second mode according to an imaging state, and wherein in a case where the processor receives a change instruction from the first mode to the second mode while the first mode is set, and the imaging state is a predetermined state, the processor is configured to maintain a setting of the first mode while the imaging state is the predetermined state.

11. The image pickup apparatus according to claim 10, wherein the processor is configured to change a setting of the first mode to a setting of the second mode after the predetermined state of the imaging state ends.

12. The accessory apparatus according to claim 10, wherein in a case where the processor receive a predetermined imaging instruction while the processor is in the second mode, the processor is configured to change the second mode to the first mode and then to permit imaging.

13. A control method for an optical apparatus comprising the steps of:

simultaneously driving a first optical system and a second optical system arranged in parallel with the first optical system in a first mode;

acquiring a change instruction from the first mode to a second mode in which the first optical system and the second optical system are independently driven; and changing from the first mode to the second mode in accordance with the change instruction, wherein a timing of changing from the first mode to the second mode is changed depending on an imaging state, and wherein, in a case where the change instruction from the first mode to the second mode is received while the first mode is set, and the imaging state is a predetermined state, the first mode is maintained while the imaging state is the predetermined state.

14. A non-transitory computer-readable storage medium storing a program for causing a computer to execute the control method according to claim 13.

* * * * *